United States Patent [19]
Schneider et al.

[11] 3,843,090
[45] Oct. 22, 1974

[54] DAMPER

[75] Inventors: Heinz Schneider, Lendersdorf; Josef Becker, Obermaubach, both of Germany

[73] Assignee: Zimmerman & Jansen GmbH, Duren, Germany

[22] Filed: Jan. 11, 1973

[21] Appl. No.: 322,876

[30] Foreign Application Priority Data
Jan. 15, 1972  Germany.............................. 2201940
June 2, 1972  Germany.............................. 2226986

[52] U.S. Cl................. 251/215, 251/163, 251/228, 251/306
[51] Int. Cl............................................ F16k 31/52
[58] Field of Search ........... 251/158, 161, 162, 163, 251/215, 228, 279, 280, 305, 306, 308

[56] References Cited
UNITED STATES PATENTS

| | | | |
|---|---|---|---|
| 2,934,310 | 4/1960 | Kinney et al....................... | 251/163 |
| 2,978,222 | 4/1961 | Henrion........................... | 251/306 X |
| 3,428,064 | 2/1969 | Phillips et al. .................... | 251/280 X |
| 3,498,583 | 3/1970 | Friedell........................... | 251/308 X |
| 3,512,752 | 5/1970 | Uerlichs et al..................... | 251/308 |
| 3,658,293 | 4/1972 | Gaebel............................ | 251/228 |

*Primary Examiner*—William R. Cline
*Assistant Examiner*—David R. Matthews
*Attorney, Agent, or Firm*—Norman S. Blodgett; Gerry A. Blodgett

[57] ABSTRACT

A damper having a circular plate adapted to seal against an annular flange in a tubular housing; the plate being mounted for axial movement along the housing and for rotary movement about an axis that is transverse of the housing.

20 Claims, 4 Drawing Figures

DAMPER

BACKGROUND OF THE INVENTION

It is common practice to construct a damper with a flap-plate which lies in the closed position with a strip at its edge lying against a stationary sealing seat. Actuating levers are provided which are fastened at their free ends by pivot bolts to the central zone of the flap-plate and press the flap-plate in this closed position against the sealing seat while being capable of lifting it away for opening the damper. With dampers of this kind, guide means are in addition provided, which in the first phase of movement of the flap-plate act so that it is moved away from the sealing seat in a direction normal thereto, while in the further course of the ventilation process they effect a rotary movement of the flap-plate about the pivot bolts connecting it with the actuating levers, which proceeds with greater rate of angular rotation as the travel increases. By this cycle of movement, it is made possible for the flap-plate to be applied to and lifted away from the sealing seat in the normal direction, thus avoiding tangential components of movement, so that the seals are subjected to little wear and a good sealing action is obtained over long periods. The subsequent tilting movement (which in general takes place so far that the plane of the flap-plate lies normally to that of the sealing seat) ensures a large cross-section for passage of gas without it being necessary to construct the housing of the damper with dimensions larger than the ducting to be closed.

Dampers of this kind are illustrated under the designation "Three-lever dampers" in brochure No. 1.2.03.01-09 of the same name issued by the firm of Zimmermann & Jansen of Duren, Germany. The actuating levers of this damper are supported outside its housing proper, so that it is necessary to connect to the housing a special lateral cupola for receiving the shaft of the actuating levers. Links supported on the side of the housing are provided as guide means to ensure the cycle movement to be obtained.

The three-lever dampers certainly fulfill the expectations imposed on them and have in practice proved themselves time and again. The relatively high costs of production are, however, regarded as a problem, and this cost arises from the nature of the drive system. To start with, the mounting of the actuating lever in a special cupola to be added on at the side of the housing increases the cost of production enormously. Since the weight of and (in certain cases) the pressure-loading on the plate are carried by long-armed levers, their angle of movement for performing the travel is fairly small, but the torque applied to the axis of rotation is high. This means that highly-geared-down or exceptionally powerful positioning members have to be employed. The German Pat. OS 2 008 359 shows a cupola reduced in its dimensions without the production being thereby significantly cheapened or the other disadvantages pointed out being removed. With this known construction, the number of bearings provided inside the housing (and thereby deprived of maintenance though subjected to the temperature and contaminants of the medium flowing through) is unpleasantly high. These and other difficulties experienced with the prior art devices have been obviated in a novel manner by the present invention.

SUMMARY OF THE INVENTION

The present invention, therefore, solves the problem of simplifying and cheapening the production of dampers, as well as making provision for better adaptation to the usual positioning drive. The solution of this problem comes from the fact that the length of the actuating lever of the damper plate falls so much short of the radius of the latter that the hub of the actuating lever is brought down inside the space enclosed by the tubular housing and the shaft of the actuating lever is carried on both sides in bearings which project outwardly from the wall of the housing. A favorable lowering of the shaft is attained if the effective length of the actuating levers equals half the radius of the flap-plate or less than this. A form of the bearings which is particularly easy to repair and to attach results is these (at least in their zone intersecting the wall of the housing) are made parallelepipedal in shape and exhibit a square or rectangular cross-section. Both the production and the erection are made easier and the guidance characteristics are improved if two actuating levers are provided parallel with one another and are provided with separate hubs effecting the connection to the shaft. The guide means uses links which are supported pivotally about bolts fixedly arranged in the housing, having a length which falls short of that of the actuating levers and engaging centrally with support plates connected to the damper plate at an offset which exceeds that of the pivot bolts. The length of the links is less than 90 percent of that of the actuating levers. Favorable conditions result if the length of the links is less than 70 percent of that of the actuating levers.

It was recognized as exemplary so to arrange the bolts, pivot bolts, and shaft so that in the closed position of the damper-plate both the actuating levers and the links are inclined towards the damper-plate beyond lines normal to the axis of the housing passing through their pivots. A favorable arrangement results if, in the closed position of the damper-plate, the actuating levers and the links lie in planes parallel to one another. Advantageously, the damper-plate is provided with at least three bearing pedestals, of which one is provided centrally and carries pivot bolts with their free ends pointing outwardly, and the others are offset axially outwards and are provided with bolts for engagement with the links. The central bearing pedestal is in this case bracketed by the mutually parallel actuating levers.

The guide means can be still more considerably simplified and a number of the bearings needed in the case of the usual executions saved if the guide means uses projections which are connected with the damper-plate in the zone of the bearing pedestal for the pivot bolts for engagement with the actuating levers at an offset exceeding that of the pivot bolts from the damper-plate, those projections engaging guide curves in supporting members mounted immovably in the housing and projecting from the wall parallel with the plane of rotation of the actuating levers. A particularly simple construction results if the extended bearing pedestals provided for the pivot bolts carry the projections.

The projections are advantageously arranged in a manner offset in the direction of the shaft of the actuating levers. A particularly simple provision of the guide curve results if this is at least essentially formed in the shape of an arc of a circle, while the radius of the circle falls short of the effective length of the actuating levers.

It was found to be exemplary to keep the center of the circular arc in the closed position of the damper-plate at about the same offset from the damper-plate as the projection engaging the guide curve. Particularly effective operation results if in the closed position of the damper-plate the actuating levers are inclined towards the damper-plate beyond a line normal to the axis of the housing passing through their shaft. The projection lies in a portion of the guide curve which extends in the direction of the damper-plate beyond a line normal to the axis of the housing, which passes through the center of the circular arc of the guide curve, at a small offset beyond the normal to the axis.

A simplification of the components connected to the damper-plate results if the damper-plate uses only two bearing pedestals which hold the projection, for example, in the form of a bolt, between them and are provided with pivot-bolts pointing outwardly.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
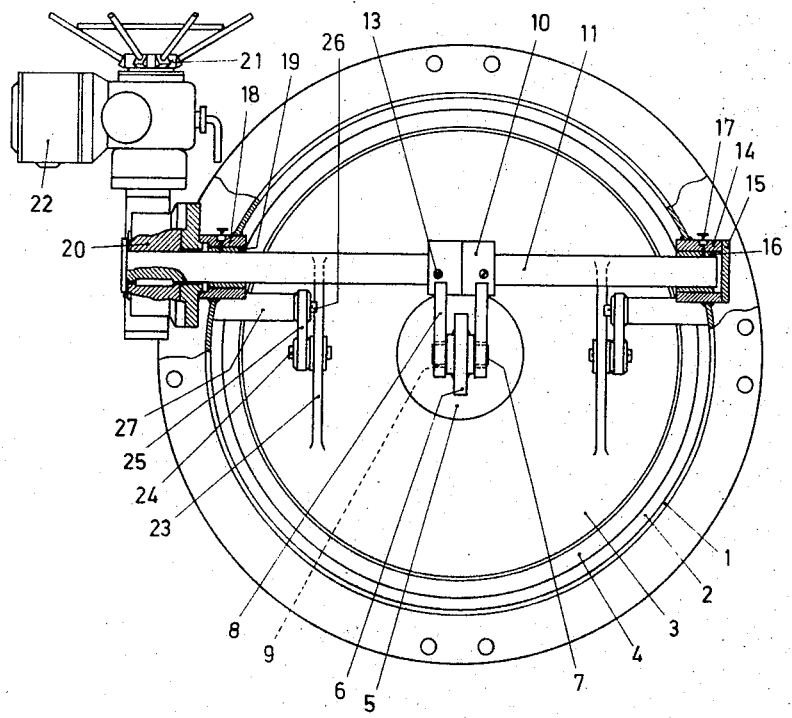
FIG. 1 is a transverse view of a damper partially sectioned.
Figure 2:
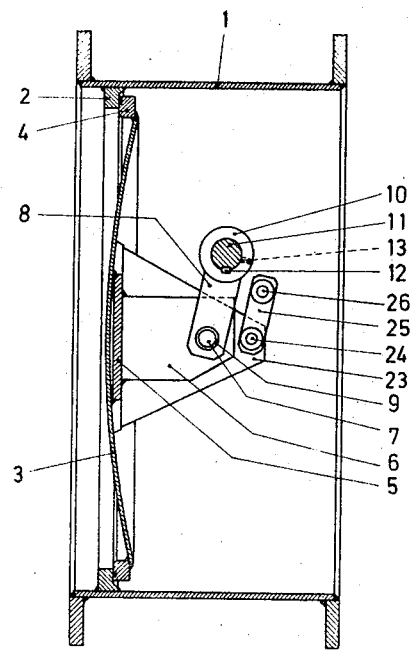
FIG. 2 is a longitudinal sectional view of the damper.

In FIGS. 1 and 2 a damper is displayed having a housing 1 of which is made tubular, which is terminated at both ends by flanges, and has an annular sealing seat 2. In the closed position a damper-plate 3 is shown as having a sealing frame 4 which lies against the sealing seat 2.

On its back the damper-plate 3 is stiffened centrally by a plate 5 which carries a bearing pedestal 6. A the end of it the bearing pedestal is strengthened at both ends by discs by means of which it supports a pivot bolt 7. The free ends of the pivot bolt 7 are embraced by bearing bushes 9 provided in the free ends of actuating levers 8. The actuating levers are respectively connected with hubs 10 which are pushed onto a shaft 11 and connected non-rotatably therewith by keys 12, while security against axial shifting is effected by screws 13. The shaft 11 is held at both ends in bearings which are inserted in apertures in the wall of the housing 1 and welded in place. The machining of the apertures as well as the welding in are made considerably easier by the bearings being formed with a rectangular or square cross-section. While each bearing 14 is closed by a cover 15, the bearing body is open for the free end of the shaft 11 to project through. The bearings 14 and 18 are each provided with bushes 16 and 19 and they use grease nipples 17 in case they are used with lubricant exhibiting low and medium temperatures. In particular, in the event of being subjected to fairly high pressures the bearing body 18 at least is provided with seals, not shown. In the case of application of higher pressures it is to be recommended that the bearing 14 be equipped with seals and the cover 15 drilled through in order to avoid axial thrust on the shaft 11. For lubricant of higher temperature, the bushes 16 and 19 are designed to be maintenance-free and, for example, produced from graphitic cast-iron.

On the free end of the shaft 11 the hub 20 of an actuating lever is mounted and fixed against rotation by a key, the fork shape of the lever embracing a spindle-nut and guiding it against rotation. The positioning spindle embraced by the spindle-nut can be actuated by a handwheel 21. Usually, however, positioning is brought about by a positioning motor 22 which is advantageously formed as a geared motor.

The guide means uses bearing pedestals 23 to which links 25 are articulated by means of bolts 24 and can be pivoted about bolts 26 from spacers 27. The bolts 26 can be provided in one piece with the spacers 27 connected with the wall of the housing. The bolts 24, lie, as shown in FIG. 2, in the same central plane as that in which the pivot bolt 7 also lies and are arranged at a greater offset from the damper-plate 3 than the pivot bolt 7. In the closed position shown in FIG. 2, the links lie in a plane parallel with the actuating levers 8 and their effective length, i.e., measured from axis to axis amounts to about 55 percent of that of the actuating levers. Here too, maintenance-free bushes are provided with such clearance and cover means that (even with lubricant which is difficult to control) trouble-free service is achieved over long periods.

When the damper is actuated by turning the shaft 11, it can be shown that the movement of the damper-plate 3 takes place in a guided manner with the required action: the pivot bolt 7 is guided along a circular arc about 90° in length with the effective radius of the actuating lever 8 about the shaft 11, while at the same time the axis of the bolts 24 is moved with considerably smaller radius by means of the links 25 about the axis of rotation determined by the bolts 26. Through the parallel starting position, as well as the slight inclination of both the actuating levers and the links towards the damper-plate 3, both movements at the beginning of the paths of movement run approximately tangentially to the circles by the actuating levers and the links and essentially symmetrically. This means that the damper-plate is lifted away essentially from the sealing seat 2. Consequently, at the beginning of the path of movement, the actuating levers 8 jointly with the links 25 act in a manner approximately that of a parallelogram mechanism. With increasing angle of rotation, however, it is evident that the radius of the links 25 is smaller than that of the actuating levers 8. Soon after the lifting away of the damper-plate 3 from the sealing seat, the axis of the bolts 24 begins to be swung sideways in addition, so that, after the original lifting away of the damper-plate 3 approximately normal to the axis, a rotating movement is effected in increasing proportion. After a positioning angle of about 90° a swing of the damper-plate 3 through 90° is effected, so that it lies flat in the flow path of the gas and leaves the cross-section of the passage clear.

The arrangement shown has proved to be extraordinarily advantageous. The considerable reduction of the effective length of the actuating levers 8 to a third to a quarter of the length that was formerly necessary with journalling of the shaft effected outside the housing, certainly requires for the positioning travel an increased positioning angle, but smaller driving torques than before. Therefore, the drive can be effected by reduction gearing of smaller ratio of reduction. Correspondingly, when necessary, a driving lever connected to the free end of the shaft can be designed with a shorter length than usual and hence save space. Considerable advantage results, however, from the simple design of the housing, since a special cupola set on the side can be dispensed with, and from the resultant smaller space required by the damper. The damper of the invention can be produced significantly more cheaply, simply, and stronger than known members with comparable damper-plate movement. It also exhibits (owing to the internally placed shaft considerably smaller dimensions. The housing is stronger than usual, because the cutting away of its tubular body for the mounting of a cupola is avoided, so that the stress lines of forces acting upon it can run in ideal directions of action. The drive means are conceivably of simple and robust form. so that, besides the simplicity of construction, there result also the advantages of simple erection and maintenance as well as less susceptibility to trouble.

Figure 3:
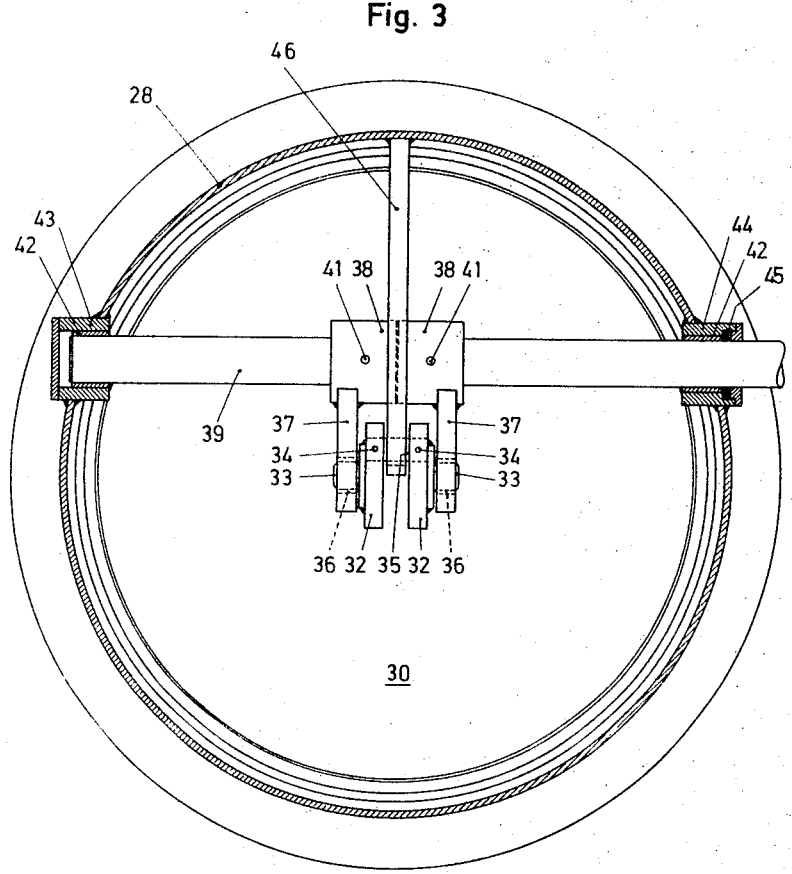
FIG. 3 is a transverse sectional view of a modification of the damper.
Figure 4:
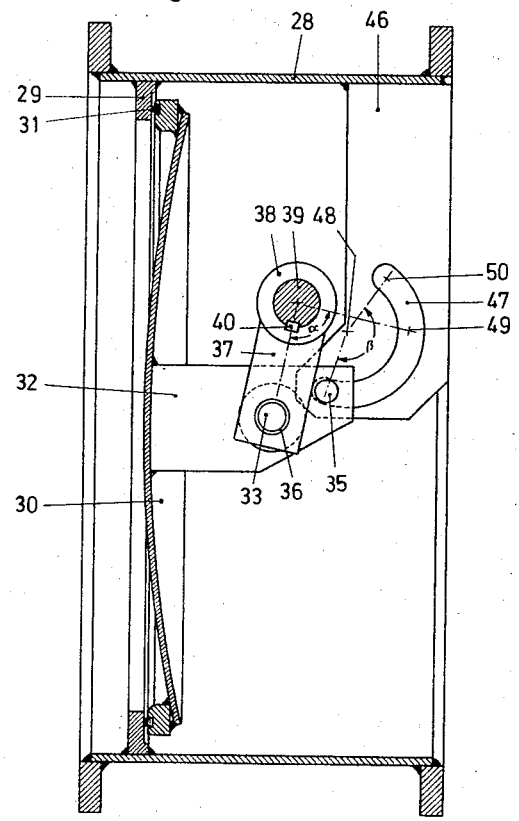
FIG. 4 is a longitudinal sectional view of the damper shown in FIG. 3.

In FIGS. 3 and 4 a damper is shown, the guide means of which uses a plate in which a guide curve is machined. The tubular housing 28 is terminated at both ends by flanges and has a sealing seat 29. In the closed position, as shown, the damper-plate 30 lies with its seals 31 pressed against the sealing seat 29.

On the back of the damper-plate 30 are mounted two bearing pedestals 32 which are provided with pivot bolts 33 pointing outwardly. A bolt 35 connects them together and is secured in its axial position by pins 34. For securing the position and transmitting larger torques, the pivot bolts are provided on the sides next to the bearing pedestals with wide supporting discs. The free ends of the pivot bolts 33 are embraced by bearing bushing 36 which, in turn, are embraced by the free end of the actuating levers 37. The actuating levers 37 are each provided with hubs 38, which are pushed onto the shaft 39, axial shifting is prevented by pins 41. The shaft 39 is held at both ends in bearing bushings 42 in bearings 43 and 44, which are inserted in apertures in the wall of the housing 28 and welded in place. The machining of the apertures as well as the welding are made considerably easier because the bearings are formed with a rectangular or square cross-section. While the bearing 43 is made closed, the bearing 44 is open at both ends for the free end of the shaft 39 to pass through and provided for sealing with a sealing packing 45. The bearing bushings 36 and 42 are (in the case of higher temperature gas) produced from graphitic cast-iron so as to be maintenance-free. They can, however, also be provided, insofar as the housing temperatures resulting from the temperatures of the gas allow it, with grease nipples, oil cups, or the like, or else used with some other special lubrications means.

A blade 46 extending radially into the space inside the housing is connected with the wall and is provided with a guide curve 47, which embraces the bolt 35. For the sake of simple manufacture the guide curve is formed in the shape of an arc of a circle the center 48 of which exhibits a larger offset from the sealing seat than the shaft 39; the offset from the axis of the housing is smaller than that of the shaft. The radius of the guide curve 47 is smaller than the effective length of the actuating levers 37. The guide curve 47 extends beyond the normal to the axis, which passes through its center 48, in the direction of the sealing seat, so that the bolt 35 over the last phase of the closing movement is guided approximately parallel to the axis of the housing, while at the same time it is pivoted slightly towards the shaft 39.

When the damper of FIG. 3 is actuated, it can be shown that the movement of the damper-plate 30 takes place in a guided manner with the required action. The axis of the pivot bolt 33 is guided in a circular arc of about 90° in length with the effective radius of the actuating levers about the shaft 39, while the point determined by the axis of the bolt 35 is moved about the center 48 along the guide curve 47. At the beginning of the path of movement, both movements run approximately tangentially to the circles described by the actuating levers and the circular arc of the guide curve. Were both circular arcs executed with equal radii, a shift of the damper-plate 30 as a whole along a circular arc without rotation would result, i.e., the loci of all points on the damper-plate 30 would run parallel with one another. However, since the radius of the guide curve 47 is smaller than the effective length of the actuating levers, the axis of the bolt 35 begins, even in the beginning, to be guided sideways. From the original lifting away of the damper-plate 30 approximately normally to the axis, an additional rotating movement is effected in increasing proportion. After the angle of rotation has passed through about 90°, the pivot bolts 33 are aligned with the point 49, while in the same period the bolt 35 has travelled through an angle which is approximately 170° of the guide curve 47 and aligns with the point 50.

With the desirable dimensions and arrangements shown in FIG. 4, of the shaft, pivot bolt, bolt 35, and also the guide curve, a movement of the damper-plate 30 is achieved which, first of all, proceeds as approximately normal translation from the plane of the sealing seat 29 and in its further progress is increasingly combined with a rotational movement which rotates the damper-plate 30 by 90° out of the flow of the gas into a position parallel with the axis.

The arrangement shown has proved to be extraordinarily advantageous. As in the case of the embodiment shown in FIGS. 1 and 2, a simple production of the housing results, since a special cupola set on the side can be dispensed with and the resultant smaller space required by the arrangement is of advantage. Furthermore, the guide means is simplified and the number of bearings involved has been reduced to a total of four, two of which are accessible from outside and thus easy to maintain. Two other bearings still lie in the flow path of the gas and have to be construed in a maintenance-free manner; the susceptibility to trouble arising from maintenance-free bearings is thereby considerably reduced, especially since the two bearings supporting the free ends of the actuating levers are operated with a large angle of rotation, so that seizure of the non-maintained bearings is not to be feared. Guidance is effected by hardening the bolt 35 in an appropriate manner. For the sake of simplicity, a bolt of round cross-section is provided; the possibility also exists, however, of designing the zone of contact of the bolt with the walls of the guide curve 47 with larger radius of curvature and accordingly to depart from the round cross-section, if this is deemed necessary to reduce the surface loading. The guidance along the whole guide curve in any case prevents both coating with particles carried in the gas flow and also clogging arising from corrosion, as can occur in the case of the usual bearings of the known guide means.

Dampers constructed in accordance with the invention can be produced significantly more cheaply and simply than known dampers with comparable movement of the damper-plate, and they also exhibit considerably smaller dimensions due to the internally located shaft. The driving torque needed is smaller than in the case of comparable shut-off members previously known and, besides the advantages of simple manufacture, appear those of simple erection and maintenance as well as little susceptibility to trouble.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A damper, comprising:
   a. a tubular housing having an intermediate internal annular seat,
   b. a damper plate mounted within the housing for swinging movement about a transverse shaft from a first position wherein its periphy engages the seat to a second position removed from the seat,
   c. an actuating lever connecting the plate to the shaft for providing pressure of the damper plate against the seat,
   d. guide means independent of the actuating lever for regulating the motion of the damper plate from the first position to the second position in such a way that the movement adjacent the first position is primarily transverse motion in the direction of a line at a right angle to the plane of the seat and in such a way that the part of the motion adjacent the second position is primarily swinging movement about an an axis spaced from and parallel to the said plane of the seat,
   wherein the length of the actuating lever (8, 37) of the damper plate (3, 30) is shorter than the radius of the plate and a hub (10, 38) of the shaft lies within the space enclosed by the tubular housing (1, 28), and
   wherein the shaft (11, 39) of the actuating lever is guided on both sides in bearings (14, 18, 43, 44) that project outwardly of the housing and are mounted in the wall of the housing.

2. A damper as recited in claim 1, characterized by the fact that the effective length of the actuating lever (8, 37) is less than half the radius of the damper-plate (3, 30).

3. A damper as recited in claim 2, characterized by the fact that the bearings (14, 18, 43, 44) at least in the zones intersecting the wall of the housing (1, 28) are parallelepipedal in shape and exhibit a square or rectangular cross-section.

4. A damper as recited in claim 3, characterized by the fact that there are two actuating levers (8, 37) in parallel with one another and are provided with separate hubs (10, 38) effecting the connection to the shaft (11, 39).

5. A damper as recited in claim 4, characterized by the fact that the guide means have projections which are connected with the damper-plate (30) in the zone of the bearing pedestal (5) for the pivot bolts (6) for engagement with the actuating levers (37) at an offset exceeding that of the pivot bolts from the damper-plate, and engage guide curves (47) in supporting members (blade 19) mounted fixedly in the housing (28) and projecting from the housing wall parallel to the plane of rotation of the actuating levers.

6. A damper as recited in claim 5, characterized by the fact that the extended bearing pedestals (37) have projections (35).

7. A damper as recited in claim 6, characterized by the fact that the bearing pedestals (32) bracket one projection bolt (35) between them.

8. A damper as recited in claim 7, characterized by the fact that a projection is formed as a stud bolt (35).

9. A damper as recited in claim 8, characterized by the fact that a supporting member formed as a blade (46) is arranged radially to the housing (28).

10. A damper as recited in claim 9, characterized by the fact that the projection bolt (35) is arranged in offset relationship to the axis of the symmetry of the damper-plate (30) in the direction of the shaft (39) of the actuating levers (37).

11. A damper as recited in claim 10, characterized by the fact that the guide curve (47) is formed in the shape of an arc of a circle and the circular arc exhibits a radius which is shorter than the effective length of the actuating levers (37).

12. A damper as recited in claim 11, characterized by the fact that the center (48) of the circular arc in the closed position of the damper-plate (30) has about the same offset from the damper-plate as the projection bolt (35) which engages the guide curve (47).

13. A damper as recited in claim 12, characterized by the fact that in the closed position of the damper-plate (30) the actuating levers (37) are inclined towards the damper-plate beyond the right angular line to the axis of the housing (28) passing through their shaft (39), and that the projection bolt (35) lies in a portion of the guide curve (47) which extends in the direction of the damper-plate (30) beyond the normal to the axis of the housing (28), which passes through the center (48) of the circular arc of the guide curve, at a small offset beyond the normal to the axis.

14. A damper as recited in claim 13, characterized by the fact that the damper-plate (30) has two bearing pedestals (32) which hold the projection bolt (35) between them and are provided with pivot-bolts (33) pointing outwardly.

15. A damper as recited in claim 4, characterized by the fact that
the guide means is in the form of links (25) which are supported pivotally about bolts (26) in the housing, have a length less than that of the actuating levers (8), and are engaged centrally with support plates (23) connected to the damper plate (3) at an offset which exceeds that of the pivot bolt (7) of the actuating lever, and that of the length of the links falls is less than 90 percent of that of the actuating levers.

16. A damper as recited in claim 15, characterized by the fact that
the length of the links (25) falls is less than that of the actuating levers (8) by more than 30 percent.

17. A damper as recited in claim 16, characterized by the fact that
in the closed position of the damper-plate (3) both the actuating levers (8) and the links (25) are inclined towards the damper-plate (3) beyond 90° to the axis of the housing (1), passing through their pivots.

18. A damper as recited in claim 17, characterized by the fact that
in the closed position of the damper-plate (3) the actuating levers (8) and the links (25) lie in planes which are parallel with one another.

19. A damper as recited in claim 18, characterized by the fact that
the damper-plate (3) is provided with at least three bearing pedestals (6, 23) of which one (6) is located centrally and carries pivot bolts (7) with their free ends pointing outwards, and the others (23) are arranged to be offset axially outwards and are provided with bolts (24) for engagement with the links (25).

20. A damper as recited in claim 19, characterized by the fact that
the parallel actuating levers (8) bracket the bearing pedestal (6) between them.

* * * * *